July 16, 1935.    S. CARLSON    2,008,386
MARINER'S PARALLEL RULER
Filed July 10, 1933
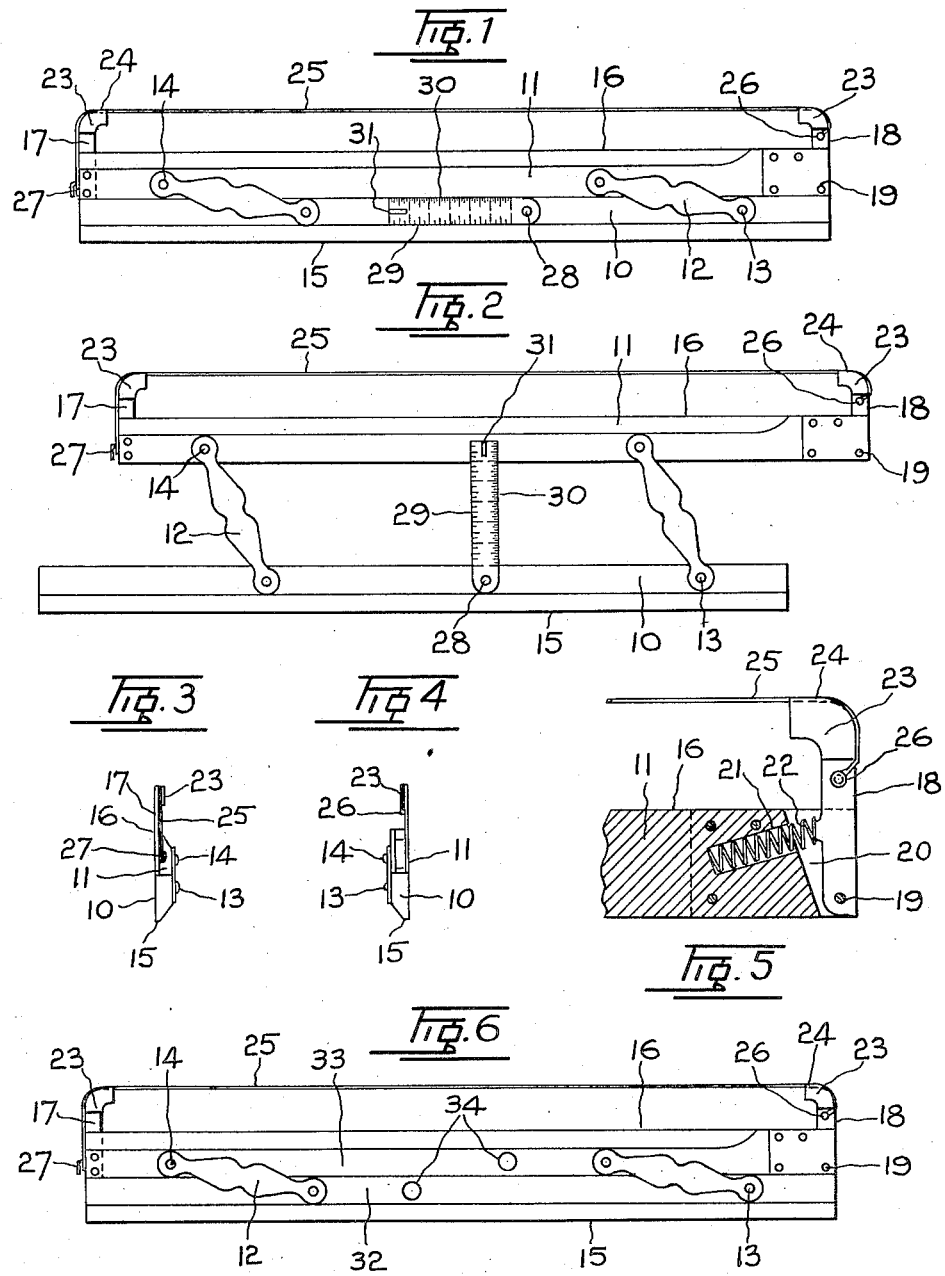
INVENTOR
STEPHEN CARLSON
BY Ernest E Carver
ATTORNEY Patented July 16, 1935

2,008,386

UNITED STATES PATENT OFFICE 2,008,386

MARINER'S PARALLEL RULER

Stephen Carlson, Vancouver, British Columbia, Canada

Application July 10, 1933, Serial No. 679,641
In Canada July 11, 1932

2 Claims. (Cl. 33—108)

The invention relates to mariners' parallel rulers and more particularly to a chart reading rule for maritime service.

The primary object of the invention is the provision of a ruler of this character wherein distances may be measured upon a mariner's chart and in the application of the ruler for this purpose the chart data is clearly visible so that a person can be accurately informed of the character of the course for a vessel and thus be cognizant of dangers along the course, as the conditions as disclosed by the chart can be observed without obliteration by the ruler in the use thereof.

Another object of the invention is the provision of a ruler of this character, wherein the construction thereof is novel in form so that it can be adjusted with dispatch for the laying off of a course for a vessel or the like and the distance determined for the destination of the vessel, while the ruling blades are so associated that clear vision of a mariner's chart can be had in the use of the ruler thereon and at a glance it can be determined whether the course is along broken coast line, narrow channels or other irregularities so that a ship master or navigator will be fully conversant with the course, whereby it may be traveled by night or in fog without a chance of a mishap or ship interference.

A further object of the invention is the provision of a ruler of this character, wherein the construction thereof permits the easy use of a mariner's chart and the compass diagram as common thereto, so that a navigator may map out a steering course for a vessel and full vision at a glance may be had of the nature thereof whereby the navigator will be possessed of this information without requiring the shifting of the ruler when upon the map for the laying out of a vessel's course.

A still further object of the invention is the provision of a ruler of this character, which is extremely simple in construction, thoroughly reliable and efficient in its purpose, readily and easily adjusted, light in weight yet durable, and inexpensive to manufacture.

With these and other objects in view, the invention consists in the features of construction, combination and arrangement of parts as will be hereinafter more fully described, in detail, illustrated in the accompanying drawing, which discloses the preferred embodiment of the invention, and pointed out in the claims hereunto appended.

In the accompanying drawing:—

Figure 1 is a plan view of the ruler constructed in accordance with the invention.

Figure 2 is a view similar to Figure 1 showing the ruler adjusted.

Figure 3 is an end view of Figure 1.

Figure 4 is a view similar to Figure 3 looking toward the opposite end of the ruler.

Figure 5 is an enlarged fragmentary longitudinal sectional view through the ruler.

Figure 6 is a plan view similar to Figure 1 showing a slight modification.

Similar reference characters indicate corresponding parts throughout the several views in the drawing.

Referring to the drawing in detail, the ruler comprises a pair of plural blades or bars 10 and 11 respectively, these in their association constituting parallel rulers adjustable with respect to each other through the medium of links 12 pivoted at 13 to the blade or bar 10 and at 14 to the blade or bar 11, as will be clearly obvious. The links 12 are spaced a determined distance from each other, preferably to be disposed near opposite ends of the blades or bars 10 and 11.

The bar 10 has an outer beveled ruling edge 15 and likewise the bar 11 has the beveled ruling edge 16.

The bar 11 carries a pair of arms 17 and 18 respectively, the arm 17 being riveted or otherwise made fast at one end of said bar to have its major portion extend at right angles thereto, while the arm 18 is supported upon a pivot 19 located within a clearance portion 20 formed in the other end of the bar 11. This arm 18 is swingingly mounted upon the bar 11 by pivot 19 and is normally disposed at substantially right angles to the bar, while in a recess 21 in this bar is a coiled expansion spring 22, the latter working against the arm 18 to maintain the same under tension.

The arms 17 and 18 at their outer ends are formed with curved tips 23, each being provided with a groove or channel 24 and trained over these tips 23 is a ruling wire or strand 25, one end of which is detachably engaged with an anchoring pin 26, while the other end is engaged with a hook 27, the pin 26 being preferably carried by the swinging arm 18 and in this mounting of the wire or strand 25 the spring 22 will maintain it taut and parallel with the ruling edge 16 of the bar 11, as should be apparent.

The bar 10 has pivoted at 28 thereto a swinging scale member 29, the latter having marks 30 thereon exposed and these marks being indicative of inches and fractions thereof so that by the positioning of the said member 29 with relation to the bars 10 and 11 it can be readily determined at a glance the distance the blades or bars have been opened with respect to each other and this distance is congruous with mileage, as each inch of the scale is equivalent to two miles distance. The member 29 at its upper end is provided with a finger nib 31 so that it can be manually turned onto the blade or bar 10 or at right angles thereto to overlie the bar 11 when the member 29 has been swung to the position shown in Figure 2 from the position shown in Figure 1 of the drawing.

In Figure 6 of the drawing there is shown a further modification of the invention wherein each bar 32 and 33 has fitted therein finger grips or lugs 34 to permit the easy opening or closing of these bars with respect to each other as will be apparent.

In the use of the ruler the ruling wire or strand is brought into position to match a determined course and the chart with which the ruler is used is clearly visible as to the data thereon on both sides of the wire or strand so that the user of the ruler can observe at a glance the nature or conditions present at this course and on opening the bars with respect to the center of a compass diagram, that is to say, bringing one bar to the center of said diagram, the steering course of a vessel and the distance between fixed points may be readily determined.

What I claim as my invention is:

1. A ruler comprising a pair of parallel blades, links swingingly connecting the blades for opening and closing movement, a pair of arms extending from one of said blades and a wire extending parallel to the blade supported by said arms, one of said arms being pivotally connected to the blade, and spring means for exerting a tension on the wire through said arm.

2. A ruler comprising a pair of parallel blades, links swingingly connecting the blades for opening and closing movement, a pair of arms mounted at the free ends of one of the blades and extending therefrom, a wire supported by the arms parallel to the blades, one of said arms being pivotally connected to the blade and a spring anchored to said blade for urging the arm outwards to tension the wire.

STEPHEN CARLSON.